United States Patent Office 2,715,606
Patented Aug. 16, 1955

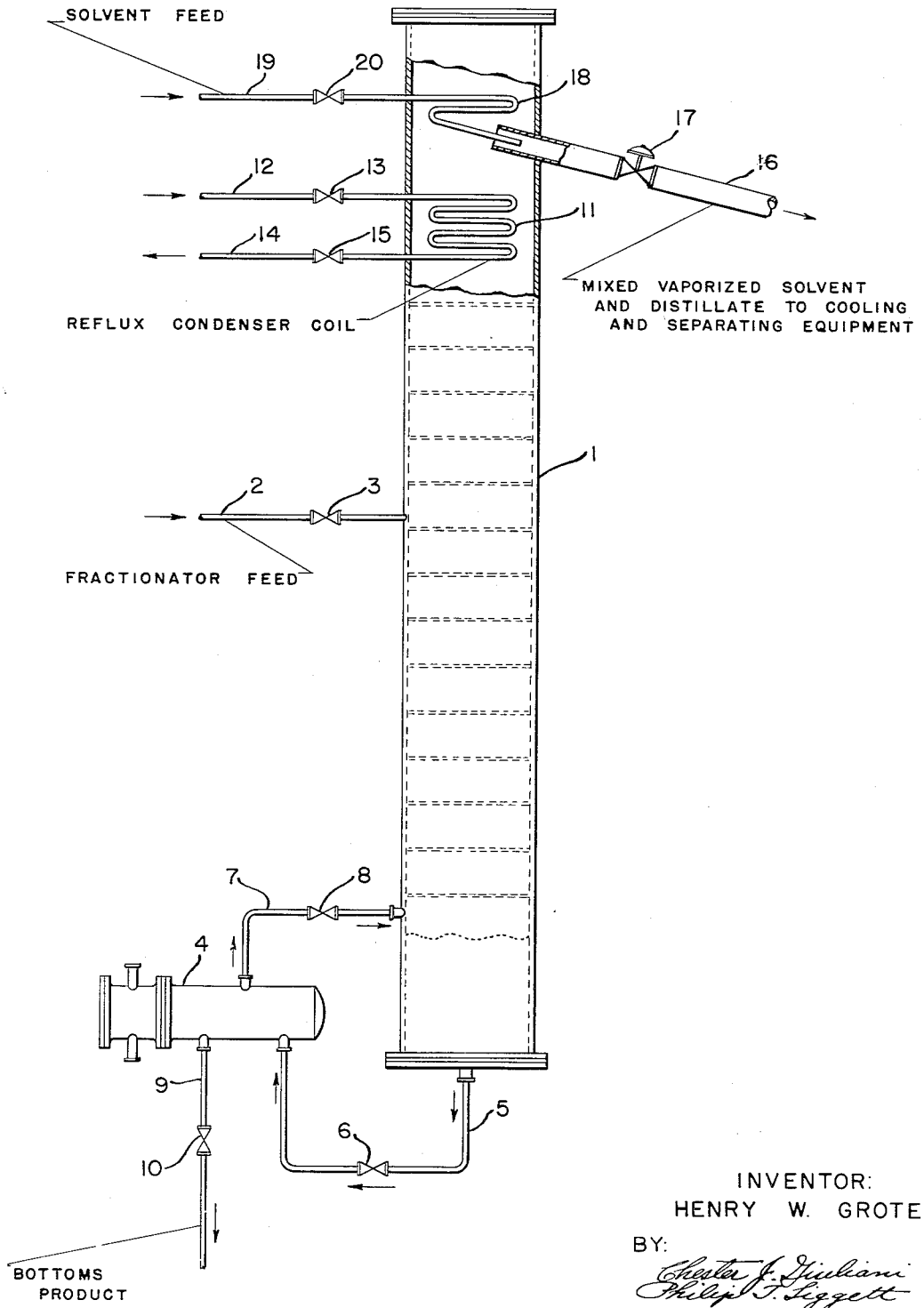

2,715,606

SOLVENT TREATMENT OF VOLATILE IN THE FRACTIONATION OF NORMALLY SOLID MATERIALS

Henry W. Grote, Hinsdale, Ill., assignor to Universal Oil Products Company, Chicago, Ill., a corporation of Delaware Application October 2, 1952, Serial No. 312,774

5 Claims. (Cl. 202—66)

The present invention relates to a method for effecting the fractionation of certain high temperature melting point materials and more particularly to means for carrying out the fractionation or distillation of normally highly viscous, or normally solid or semi-solid materials, so as to preclude plugging of vapor lines and condensers with deposited solid materials.

Various types of sublimable materials and various types of high melting point substances are difficult to separate from one another by fractional distillation because of the physical properties of the resulting distillate. In other words, where a normally solid or viscous material is separated from a still higher boiling material and/or materials by fractional distillation, the distillate material may well condense or crystallize sufficiently at the upper end of the fractionating zone to cause undue deposition therein and/or the plugging of vapor lines and cooling equipment. For example, in effecting the distillation of aluminum chloride in the presence of aluminum metal or other metal impurities, in order to obtain a substantially pure aluminum chloride, there is difficulty in the distillation operation because of the tendency for the vapors to solidify in the upper portion of the zone or in the vapor outlet and transfer lines. Also, in the distillation and separation of unreacted hydroquinone from a resulting reaction product utilizing the latter, such as in the production of an ether or other higher boiling product, the distilled hydroquinone vapors tend to solidify or crystallize within the upper portion of the fractionation zone as well as in the vapor outlet lines and condensing equipment. In still another instance, it may be desirable to effect the fractional distillation and separation of paraphenylenediamine from mono- and di-butylated paraphenylenediamines, where the resulting distillate vapors of the paraphenylenediamine tend to crystallize or solidify within the upper end of the fractionation zone as well as in the vapor outlet lines and condensing equipment. In connection with certain types of fractionation and distillation operations, it has been a customary practice to add a suitable inhibiting agent or compound to the fractionation zone either separately or commingled with the charge stream so that the formation of viscous polymers or like deposits are prevented from forming and collecting in the upper portion of the fractionating zone or in the recovery equipment. However, such inhibitors do not necessarily function as a carrying medium for the product stream, but modify the physical or chemical properties of the distillate.

It is a principal object of the present invention to provide means for commingling a solvent medium with the distillate vapors in a manner precluding the premature condensation of a high boiling point distillate material.

It is also an object of the present invention to provide for the vaporization of a solvent stream within the upper portion of the distillate zone by heat exchange with the high boiling point distillate vapor prior to effecting the commingling of the solvent and distillate vapors.

Briefly, the present invention embodies an improved method for effecting the fractional distillation and separation of a normally solid or semi-solid material having a relatively high boiling point from still higher melting point materials and precluding the deposition of solid material within the fractionation and recovery zones, in a manner which comprises, continuously commingling a solvent medium with the resulting vapor stream of the high melting point material directly within the upper portion of the fractionation zone, discharging the resulting dissolved distillate product from the fractionating zone and subsequently separating and recovering the high boiling point material from the solvent medium.

In a somewhat more specific embodiment, the present invention provides a method for effecting the fractional distillation of a normally solid or semi-solid material from still higher melting point materials and precluding the deposition of semi-solid and solid materials as the vapors leave the fractionating zone, in a manner which comprises, passing a solvent medium for the distillate material through the upper portion of the fractionating zone in indirect heat exchange relationship with the distillate vapor and effecting the vaporization of the solvent medium, commingling the resulting solvent vapor directly with the distillate vapor within the upper portion of the fractionating zone, discharging the vapor mixture from the latter and subsequently condensing and separating the high melting point material from the solvent medium.

There are many organic and inorganic substances and compounds which are relatively high boiling materials and which have normally solid or highly viscous physical properties, may provide difficulty in effecting their separation from other higher boiling point materials by fractional distillation. For example, many of the normally sublimable materials (those that can be vaporized directly from the solid state) will provide difficulty in recovery when subjected to distillation. Such sublimable materials may include camphor, naphthalene, betanaphthol, phthalic anhydride, etc. The solvent medium for any particular high boiling point material which is to undergo distillation and recovery should be preferably one that is readily separable from the condensed and solidified distillate by filtration, settling and decantation, or distillation, etc., and thus should have suitably different physical properties. The solvent medium may be sprayed in liquid state into admixture with the distillate vapor being withdrawn from the fractionation or distillation zone so as to obtain efficient mixing with the distillate, however, preferably the solvent medium is vaporized and intimately mixed with the distillate vapor and a resulting vapor mixture discharged from the upper portion of the fractionation zone whereby a desirable resulting liquid solvent and distillate mixture is obtained.

The solvent medium may also, in a desirable embodiment, comprise one of the reactant streams which has previously been combined with the high boiling point material in a given processing operation. In connection with the aforementioned hydroquinone, where the latter is separated from a high boiling ether or other product, the solvent may comprise a reactant material. For example, mono- or dimethyl ether may be utilized as the solvent medium at the upper portion of the fractionating zone to combine with the distillate vapor, and the overhead product and the solvent separately recovered. The solvent subsequently being recycled to a prior reaction zone where hydroquinone is reacted therewith to form a desired higher boiling ether or the like. In a similar manner methyl ethyl ketone may comprise a solvent medium for preventing the deposition of crystalline paraphenylenediamine, in an operation where the latter is separated from higher boiling materials, and the methyl ethyl ketone may have the dual function of being recycled and utilized as a reactant medium in effecting the reductive alkylation of a phenylenediamine.

The present invention is illustrated diagrammatically in the accompanying drawing, while further advantages may be noted in connection therewith and the following description thereof.

Referring now to the drawing, there is shown a fractionating and distilling column 1 having a charge line 2, with control valve 3, connecting with an intermediate portion thereof such that a desired distillate product stream may be taken overhead from the column and separated from higher boiling point materials. Heat is supplied to the fractionating column 1 by a suitable reboiler means 4. The latter provides for the circulation and heating of the bottoms material in the fractionating column externally of the column. The bottoms product being withdrawn from the lower end of column 1 by way of line 5 and valve 6 is passed through reboiler 4. Heated bottoms is discharged from the upper end of reboiler 4 by way of line 7 and valve 8, and is returned to the lower portion of the fractionating column. A portion of the bottoms product may be continuously or intermittently withdrawn from the lower end of the column and the reboiler 4 by way of line 9 and valve 10.

In the upper portion of the fractionating column 1 there is shown a reflux condensing coil 11 having a cooling medium inlet line 12 with control valve 13, and an outlet line 14 with control valve 15. The condenser coil 11 provides for the formation of internal reflux at the top portion of the fractionating column 1. However, the condenser coil 11 must be operated to effect the cooling of the distillate vapor in a manner such that it is cooled to a point above the freezing point of the distillate material. In other words, the temperature must be high enough to prevent solidification of the vapors within the upper portion of the fractionating column, while at the same time maintaining a sufficiently low enough temperature to permit the formation of liquid for reflux purposes.

The present drawing indicates the distillate vapor from the upper portion of the fractionating column 1 as being withdrawn by way of an outlet line 16 which in turn has a portion thereof extending internally to the upper portion of the fractionating zone such that there is at least some degree of heating at the inlet end thereof. A suitable flow control or pressure control valve 17 may be placed in the vapor line 16 to regulate the operation of the fractionating column and the withdrawal of vapor therefrom.

Also, in accordance with a preferred embodiment of the present invention, a solvent vaporizing line or coil 18 is maintained within the upper portion of the fractionating column, in indirect heat exchange relationship with distillate vapors therein, and this solvent line discharges directly into the internal inlet end of the vapor line 16. Thus, solvent vapor may be directly commingled with distilate vapor at the outlet of the fractionating column and an intimate mixing of the solvent with the distillate obtained which each is in the vapor state. In the present embodiment, the solvent medium is fed by way of line 19 and valve 20 into coil 18, which in turn discharges into line 16 as set forth. The mixed vaporized solvent and distillate pass by way of vapor line 16 to suitable cooling and condensing equipment and to a separation zone whereby the desired product may be recovered for use or further processing. The solvent medium may be recycled to the upper portion of the fractionating zone, or as hereinbefore set forth, all or a portion of the solvent medium may be recycled to a prior reaction zone where such medium functions as a reactant stream in the processing operation.

By way of example, it will be assumed that a mixture of paraphenylenediamine dissolved in alkylated phenylenediamines is fed to the fractionating zone 1 by way of line 2. Thus, with heating supplied to the lower end of the column by the reboiler 4, fractional distillation may be carried out in a substantially normal manner within the lower portion of the column and the higher boiling alkylated phenylenediamines withdrawn by way of the bottoms of the line 9. The paraphenylenediamine vapors rising through the upper portion of the column 1 are withdrawn from the latter by way of the vapor line 16, with a portion of the vapors being cooled by reflux coil 11 and condensed to form reflux within the upper portion of the column. A portion of the distillate vapors also pass in heat exchange relationship with the solvent heating coil 18 so as to provide for at least a partial vaporization of the solvent medium prior to such medium being combined with the overhead stream at the inlet end of line 16. In some instances, the solvent feed stream entering line 19 may be in liquid form and entirely vaporized by indirect heat exchange with the distillate vapors at the upper end of the fractionating zone. Also, though not necessarily true in connection with the present example, a solvent medium may be passed through a suitable heat exchange coil maintained within the upper portion of the fractionating column and sufficient distillate vapor condensed to form the desired reflux within the fractionating column while at the same time effecting vaporization of the solvent medium within the coil itself.

In the present example, methyl ethyl ketone may be charged by way of line 19 and coil 18 into column 1 and resulting vapors commingled with the distillate vapor whereby the paraphenylenediamine is precluded from depositing or crystallizing out within the cooling and separating equipment after leaving the fractionating zone. This arrangement permits conventional type heat exchange equipment to accommodate the paraphenylenediamine in solution with the methyl ethyl ketone. The paraphenylenediamine may subsequently be recovered in pure crystalline form by evaporative crystallization which may be carried out at a temperature below its freezing point of the order of about 284° F. The methyl ethyl ketone, having a boiling point of the order of about 176° F. is readily evaporated from the crystalline product and is thus particularly suitable as a solvent medium in the operation of this example.

In a further embodiment, as mentioned briefly hereinbefore, the solvent medium may also comprise a reactant combined with the distillate product stream in a prior reaction zone. In other words, methyl ethyl ketone may be commingled with phenylenediamines in a reductive alkylation step to form monobutylated and dibutylated paraphenylenediamines. Thus, where the methyl ethyl ketone is utilized as a solvent medium, as in the present fractionation operation, the recovered solvent may be utilized for recycle to a reaction zone as well as for use as a solvent medium within the upper portion of the fractionation zone to combine with the distillate product.

It is to be understood that the foregoing example is merely one instance where a normally substantially solid material is precluded from depositing within the upper portion of the fractionating zone or in transfer lines and that the operation may be utilized with any number of other high boiling point materials having a ready tendency to crystalize or solidify from the vapor state upon cooling. Also, it is to be understood that the present drawing is diagrammatic and that the position and arrangement of coils may be varied to suit any particular processing operation, while the fractionating column itself may utilize therein suitable bubble trays, perforate decks, packing material and like equipment normally used in connection with fractionation and distillation zones.

I claim as my invention:

1. In the recovery of a normally substantially solid component from a mixture thereof with a higher boiling material, the method which comprises introducing the mixture to a vertically elongated fractionating zone, applying heat to the lower portion of said zone to vaporize said component from the mixture, cooling and partially condensing the resultant vapors in an intermediate portion of the fractionating zone to provide a refluxing medium for the fractionation, removing the remaining uncondensed vapors from the upper portion of said zone above the region of said cooling and partial condensation, commingling with the vapors being thus withdrawn a solvent for said component, subjecting the resultant mixture to condensation and separating said component from the solvent.

2. In the recovery of a normally substantially solid component from a mixture thereof with a higher boiling material, the method which comprises introducing the mixture to a vertically elongated fractionating zone, applying heat to the lower portion of said zone to vaporize said component from the mixture, cooling and partially condensing the resultant vapors in an intermediate portion of the fractionating zone to provide a refluxing medium for the fractionation, removing the remaining uncondensed vapors from the upper portion of said zone through an outlet above the region of said cooling and partial condensation, introducing to said outlet vapors of a solvent for said component for admixture with said uncondensed vapors therein, condensing the resultant vapor mixture and separating said component from the solvent.

3. The method of claim 1 further characterized in that said solvent is vaporized at least in part by indirect heat exchange with vapors in said zone prior to the commingling thereof with the vapors being withdrawn from said zone.

4. In the recovery of a normally substantially solid component from a mixture thereof with a higher boiling material, the method which comprises introducing the mixture to a vertically elongated fractionating zone, applying heat to the lower portion of said zone to vaporize said component from the mixture, cooling and partially condensing the resultant vapors in an intermediate portion of the fractionating zone to provide a refluxing medium for the fractionation, removing the remaining uncondensed vapors from the upper portion of said zone through an outlet above the region of said cooling and partial condensation, passing a liquid solvent for said component in indirect heat exchange with vapors in said zone to vaporize the solvent at least in part, then introducing the solvent to said outlet for admixture with said uncondensed vapors therein, condensing the resultant vapor mixture and separating said component from the solvent.

5. The method of claim 1 further characterized in that the first-mentioned mixture comprises a solution of paraphenylenediamine in alkylated paraphenylenediamine and said solvent comprises methyl ethyl ketone.

References Cited in the file of this patent

UNITED STATES PATENTS

| | | |
|---|---|---|
| 1,916,104 | Franch | June 27, 1933 |
| 1,939,224 | Pietzsch | Dec. 12, 1933 |
| 1,957,484 | Zimmerli | May 8, 1934 |

OTHER REFERENCES

Groggins, "Unit Processes in Organic Synthesis," 3rd ed., pub. 1947 by McGraw-Hill Book Co., Inc., New New, N. Y.